United States Patent [19]
Hayward

[11] 3,996,591
[45] Dec. 7, 1976

[54] SECURITY DEVICE FOR GARAGE DOORS

[76] Inventor: Frank Harold Hayward, R.R. 1, Sherman, Ill. 62684

[22] Filed: Oct. 2, 1975

[21] Appl. No.: 619,055

[52] U.S. Cl. .................................... 343/225; 49/25; 70/282; 292/144

[51] Int. Cl.² ............................................ H04B 7/00

[58] Field of Search ................. 343/225; 49/25, 13; 70/282, 279; 292/144; 317/134

[56] References Cited

UNITED STATES PATENTS

| | | | |
|---|---|---|---|
| 2,716,567 | 8/1955 | Turcott | 292/144 |
| 2,756,990 | 7/1956 | Reamey | 49/13 |
| 2,758,836 | 8/1956 | Purdy | 49/13 |
| 3,233,239 | 2/1966 | Crow et al. | 343/225 |
| 3,893,121 | 7/1975 | Ringer | 343/225 |

*Primary Examiner*—Glen R. Swann, III
*Attorney, Agent, or Firm*—Hill, Gross, Simpson, Van Santen, Steadman, Chiara & Simpson

[57] ABSTRACT

A locking pin for a garage door is moved longitudinally in a bushing between a door frame and a movable door by an electric motor linked to the pin. The motor is selectively actuated in one direction by a radio receiver relay or a key switch. The motor moves the pin to its unlocked position and switches signal lamps from red to green. To lock the door again, a second radio signal or switching of the key switch opens a motor switch and a biasing spring in the motor returns the pin to its locking position.

8 Claims, 5 Drawing Figures

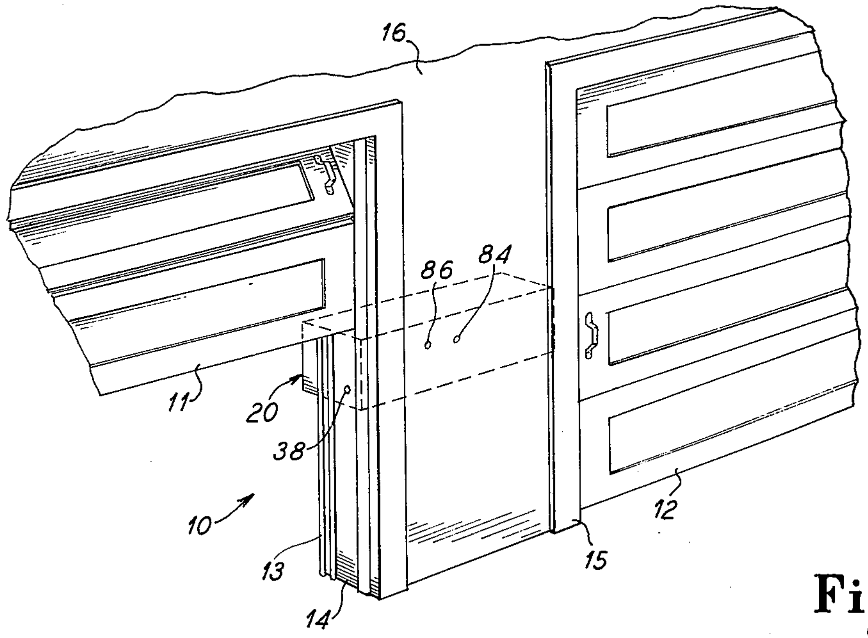
Fig. 1
Fig. 2
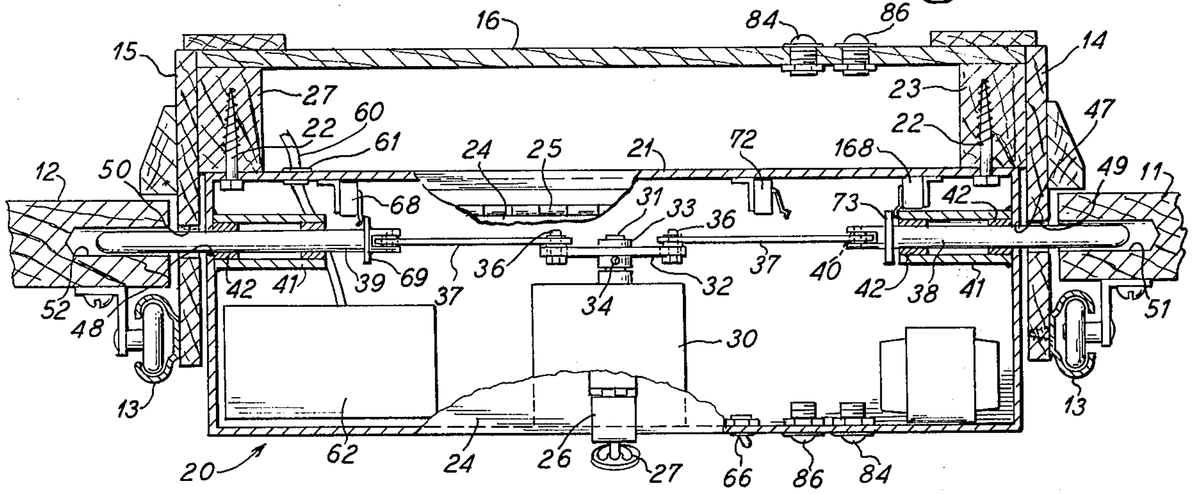
Fig. 3
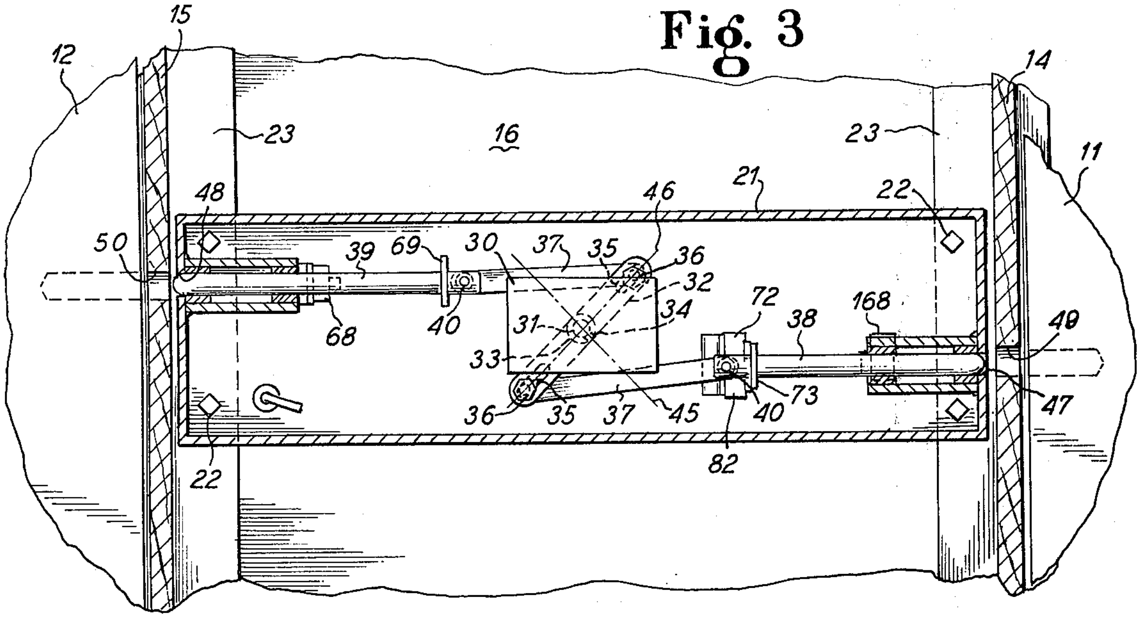

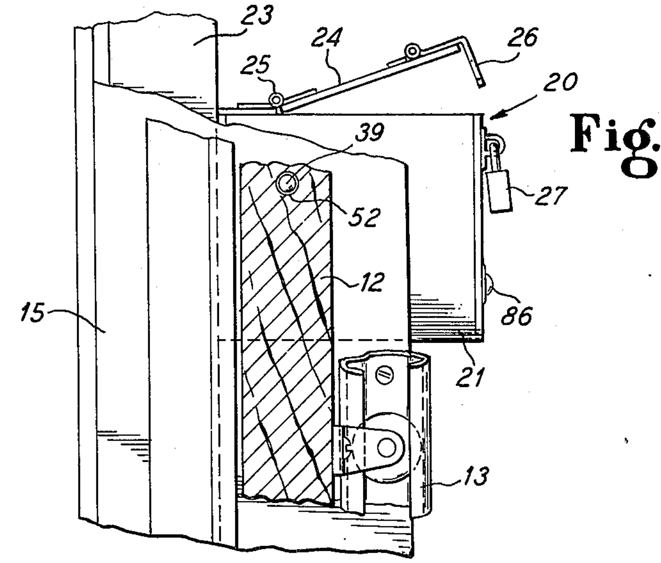
Fig. 4
Fig. 5
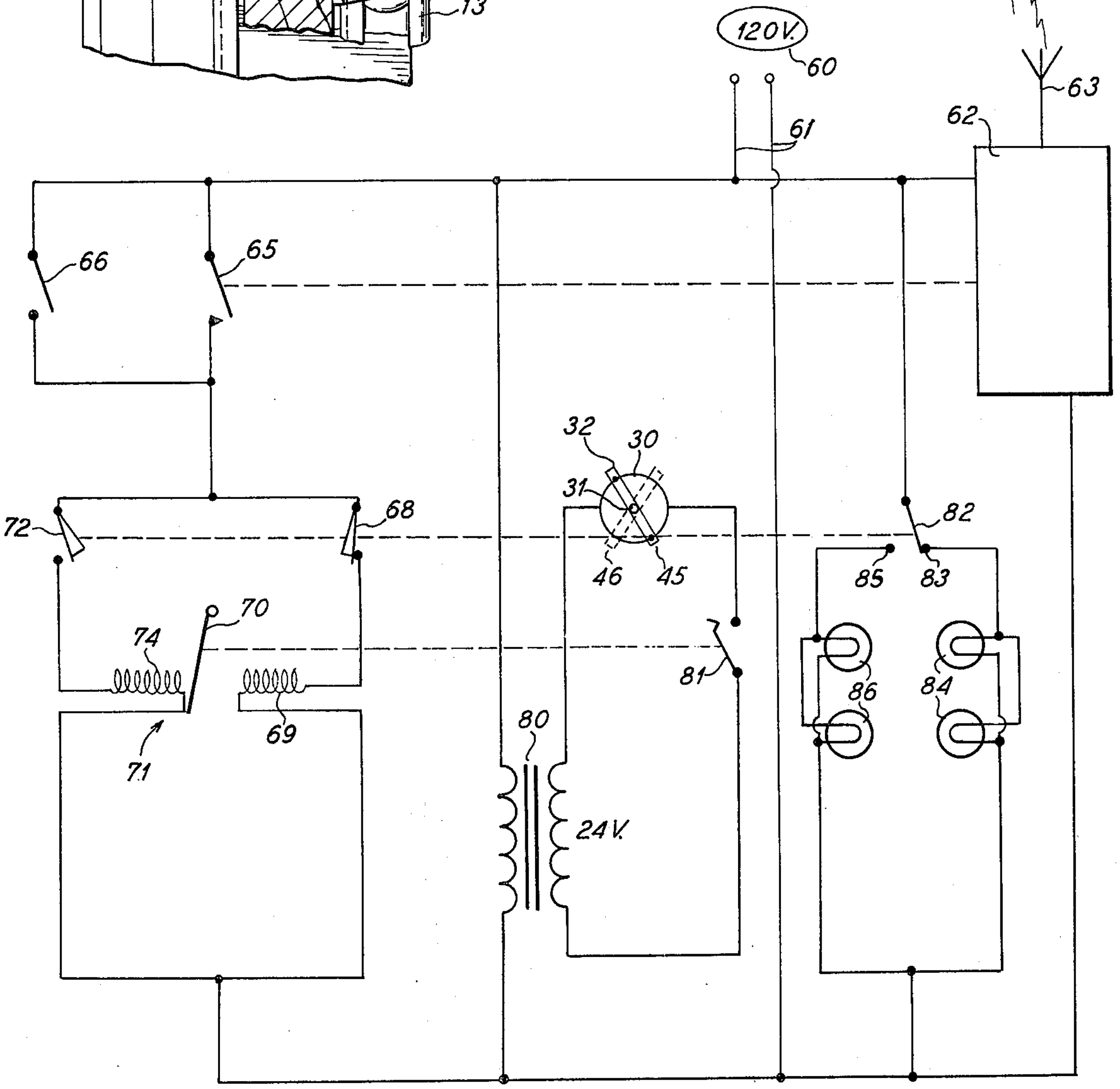

SECURITY DEVICE FOR GARAGE DOORS

BACKGROUND OF THE INVENTION

1. Field of the Invention

The present invention relates to remotely-controlled door locking devices.

2. The Prior Art

A common problem in the construction of structures such as garages where vehicular access through large, sliding overhead doors is required is to provide security against unpermitted entry and exit, while still allowing easy entry and exit by authorized persons. It is known to lock or latch a door such as a garage door by passing a pin or bolt between the door in its closed position and the door frame, as in Rea et al U.S. Pat. No. 2,927,811 or Hermann U.S. Pat. No. 3,255,618. Re et al shows a remote unlocking feature, and Zimmer et al U.S. Pat. No. 3,760,422 and others show the use of radio devices to effect remote locking controls. Wilcox U.S. Pat. No. 2,742,280 shows a garage door operator with an automatic latch, wherein actuation of the garage door opener motor actuates the latch.

SUMMARY OF THE INVENTION

It is an object of the present invention to provide a security device for a garage door which is actuable independently of any door opening system.

It is a further important object of the present invention to provide a garage door locking device which automatically locks upon a power failure.

In accordance with the principles of the present invention, an electric motor having a reduced-speed, spring biased output shaft moves an arm and a linkage means to withdraw a locking pin from engagement with a door upon actuation of the motor by secure means and to relock said door when the door is in closed position and either a proper signal is given or power to the unit fails. Upon such locking or power failure the system may be manually unlocked only if access can be had into a secure housing enclosing the locking device mechanism.

BRIEF DESCRIPTION OF THE DRAWINGS

FIG. 1 is a perspective view of a residential garage employing the present invention.

FIG. 2 is a sectional view from the top through the housing of the locking device.

FIG. 3 is a sectional view through the housing with the locking pins in unlocked position.

FIG. 4 is a view looking from the left of FIG. 2.

FIG. 5 is a wiring diagram showing the various electrical components of the device.

DESCRIPTION OF THE PREFERRED EMBODIMENTS

FIG. 1 shows a structure such as a residential garage 10 having first and second overhead-sliding doors 11 and 12 riding in tracks 13 affixed to door frame members 14, 15 set in a wall 16 of the garage 10. The doors 11 and 12 and the associated tracks 13 are conventional and may take any number of forms. FIG. 1 shows a typical placement of the security device 20 of the present invention, inside the garage 10 between the door frames 14, 15 and spaced behind the wall 16.

As shown in FIG. 2, the security device 20 is enclosed in a secure housing 21 of heavy-gauge steel or similar material which is affixed in position between doors 11, 12 by means of lag bolts 22 entering structural members 23 and 27 of the garage 10. A top portion 24 of the housing 21 is hinged as at 25 to afford access to the interior thereof. The top 24 is secured by a hasp arrangement 26 on a front portion of the housing 21 opposite the hinge 25 for receiving a padlock 27 to secure the interior of the housing 21 against unpermitted entry.

Within the housing 21, attached to an interior wall thereof, is a motor 30 having an output shaft 31. The motor 30 is preferably a motor of special construction wherein the output shaft 31 is geared to a very low speed of rotation and is spring-biased toward one limiting position. A furnace flue damper motor such as a Honeywell M836 has been found well suited to this application. Such a motor has approximately a 20-second throw through a 90° arc of the output shaft 31. Internal spring-biasing means built into the damper motor automatically return the output shaft 31 to an original position when power to the motor 30 is lost or switched off.

Attached to the output shaft 31 for co-rotation therewith is a cross-arm 32. A collar 33 on the arm releasably engages the shaft 31 by means of a set scrw 34. Removal or loosening of the set screw 34 allows the collar 33 and arm 32 to pivot about the shaft 31 independently thereof. Such freedom is necessary when the garage doors 11, 12 are to be unlocked in the event of a power failure; however, under normal conditions, the set screw 34 firmly attaches the collar 33 and arm 32 to the output shaft 31 of the motor 30.

As shown in FIG. 3, each end of the cross-arm 32 is slotted as at 35 to receive therethrough linking pins 36, 36. Carried by these pins 36, 36 are linking arms 37, 37 which are attached at their opposite ends to locking pins 38, 39 for the garage doors 11, 12, respectively. Each linking arm 37 is attached to its respective pin 38 or 39 by means of a ball joint 40 which allows te pins 38, 39 to rotate with respect to the linkage arms 37, 37 upon any attempt to saw through the pins, as well as alleviating to some extent alignment problems in the unit. Each of the locking pins 38, 39 is slidable longitudinally within cylindrical sleeves 41 having bronze bushings 42 at either end thereof. The sleeves 41 are conveniently welded to the housing 21 for strength and security.

As shown in FIGS. 2 and 3, the pins 38, 39 are retractable within the housing 21 upon actuation of the motor 30 to rotate the shaft from its first position shown by the line 45 in FIG. 3 to its second position shown by the second dotted line 46. Lines 45 and 46 are 90° apart through the shaft 31 and are at 45° to the vertical or horizontal, to obtain maximum linear throw of the pins 38, 39. The pins 38, 39 extend outwardly from the housing through apertures 47, 48 therein and through apertures 49, 50 in the frame members 14, 15 adjacent thereto. When the doors 11, 12 are in their closed positions, apertures 51, 52 therein register with the apertures 47, 49 and 48, 50, respectively, to receive the locking pins 38, 39. The doors 11, 12 may be reinforced about the apertures 51, 52 in any convenient manner, as by bushings within the apertures 51, 52 or plates affixed to the outside and/or inside faces of the doors.

Within the housing 21 are a number of electrical components to control and operate the locking mechanism. A source of power 60 enters the housing 21 through a protective grommet 61. A radio receiver for remote actuation of the system is provided, having antenna 63 which receives signals from a remote hand-held transmitter 64. The receiver 62 is responsive to signals imposed upon a carrier wave of a specified frequency, being pre-set to reject any signals of different frequency or providing incorrect intelligence information. When a signal of the proper frequency and code is received, the receiver 62 will momentarily activate a switch means, conveniently either a relay or a solid state device, but shown in the schematic of FIG. 5 as a normally-open switch 65. One or more auxiliary switches 66 may be provided in parallel to the switch or relay 65, as provided by a normally-open key switch shown in FIG. 2 as located on the housing 21. Such switch 66 could also be located at a remote location as within a house or garage, and connected to the housing 21 by means of armoured or concealed cable.

The switches 65 and 66 are each in series with a parallel circuit, each branch of which comprises a limit switch and a relay coil. A first limit switch 68 is closeable by a collar 69 on the locking pin 39 where the pin 39 is in its locked position. The first limit switch 68 is in series with a first relay coil 69 which moves an armature 70 of relay assembly 71 to an unlocking position. The second branch of the parallel circuit contains a second limit switch 72 which is closed by a collar 73 on the locking pin 38 when the pin 38 moves to its unlocked position. The switch 72 is in series with a second relay core 74 which upon energization moves the armature 70 to a locking position.

The motor 30 is, as noted above, conveniently a Honeywell M836 damper motor and requires a 24 volt circuit. A step-down transformer 80 is employed, with the secondary or output of the transformer 80 in series with the motor 30 and a single pole, single throw switch 81 which is operated from the armature 70 of the relay 71. Since the motor 30 is spring-biased to the lock position 45, power need be applied to the motor 30 only for rotation in one direction.

Indicator lights are provided in a separate parallel circuit governed by a switch 82 provided in the same housing as switch 72. A first contact 83, which is normally closed, connects lamps 84 of a first color such as red across the voltage source, while a second contact 85, which is normally open, connects lamps 86 of a second color such as green across the voltage source. A lamp of each color is conveniently placed for exterior visibility in the wall 16 of the garage and another of each color is placed on an inwardly-facing wall of the housing 21, as shown in FIG. 2. The switch contact 83 maintains the first-colored lamps 84 illuminated until collar 73 moves the arm of the switch 82 and the pins 38, 39 withdraw entirely from the garage doors 11, 12. Then the lamps 86 are illuminated by the contact 85, indicating that the system is unlocked.

In operation, when the doors 11 and 12 are closed and the pins 38 and 39 inserted into the apertures 51, 52 thereof, a signal from the transmitter 64 to the receiver 62 to close the switch 65, or closing the switch 66 by an authorized key, will send current through the series/parallel circuit on the left of FIG. 5. The first limit switch 68, which is held closed by the collar 69 on the locking pin 39 in its extended position, will guide current through the first relay coil 69 and attract the armature 70 of the relay 71 to the right. The armature 70 will stay in position to the right even when the signal from the receiver 62 is completed and the switch 65 is opened. Such movement of the armature 70 will close the motor switch 81, completing the 24-volt circuit from the transformer 80. The cross-arm 32 will be rotated by the output shaft 31 of the motor 30 from the locked position 45 through an arc of 90° to the unlocked position 46. Because of the gearing of the motor 30, such 90° motion will desireably take approximately 20 seconds.This motion of the cross-arm 32 will open the switch contact 68 as the pin 39 and collar 69 thereon to the right in FIG. 2, and switch 72 will be closed when the collar 73 on the pin 38 moves sufficiently far to the left in FIG. 2 to actuate the switch arm. Simultaneously, the switch 82 will open the contact 83 and close the connection 85 at the end of travel of the pin 83 to extinguish the lamps 84 and illuminate the lamps 86. Since the locking pins 38, 39 are withdrawn entirely from the doors 11, 12 upon illumination of the lamps 86, the doors 11 and 12 may then be freely opened.

The motor 30 will remain actuated by the closed switch 81. When one of the switches 65 or 66 is then closed, current will flow through the switch 65 or 66 and the closed switch 72 and the second relay coil 74. Current through the coil 74 will attract the armature 70 to the left, breaking the contact made by the switch 81 and disconnecting the motor 30 from the secondary of the transformer 80. The output shaft 31 and the cross-arm 32 thereon will then be free to rotate under the bias of the internal spring in the motor 30 to move the pins 38, 39 to the locked position shown in FIG. 2. Such movement of the locking pins 38, 39 will open the switch 72 and close the switch 68 so that the first relay coil 69 may be energized upon the next closing of one of the switches 65 or 66, and the switch 82 will break contact from the connection 85 and make contact with the connection 83 to extinguish the lamps 86 and illuminate the lamps 84 to indicate that the system again is locked. The system will remain locked until one of the switches 65, 66 is again closed, keeping the structure 10 secure against unauthorized entry or departure through the doors 11, 12.

It is also contemplated that the system may be used with only one garage door. In this case the linking arm 37 and the locking pin 39 would be omitted, and the switch 68 relocated to the position of switch 168 in FIG. 2, to be actuated by the collar 73 on the pin 38. Some rearrangement of the internal parts of the security device may be effected to make the housing 21 more compact, but such rearrangement is well within the skill of those in the art.

Although various minor modifications might be suggested by those versed in the art, it should be understood that I wish to embody within the scope of the patent warranted hereon all such modifications as reasonably and properly come within the scope of my contribution to the art.

I claim as my invention:

1. In combination with a door movable in a fixed frame between open and closed positions and a security device comprising a locking pin longitudinally movable between said frame and means forming an aperture in said door, the aperture being registrable with and acceptable said pin in locking engagement therewith when said door is in said closed position, an electric motor in said security device having an output shaft and an arm mounted transversely thereon for rotation therewith, said shaft having resilient means biasing said arm toward a first rotational position and being rotatable by said motor to a second rotational position; and linkage means between said arm and said pin for transforming rotational movement of said arm to longitudinal movement of said pin, said linkage means moving the pin into locking engagement with said door aperture when said shaft is in its first position and said door is in its closed position, and removing said pin from said aperture upon actuation of said motor and rotation of the shaft to its second position.

2. The combination of claim 1, wherein said arm is mounted on said output shaft by a set screw, said screw being removable in case of power failure to permit manual unlocking of the door by rotation of said arm independently of said motor shaft.

3. The combination of claim 1, further comprising circuit means including:

a voltage source;

a secure switch in series across said voltage source with a parallel circuit having in a first branch thereof a first coil of a relay and a first normally open limit switch and in a second branch thereof a second coil of said relay and a second normally open limit switch, said secure switch being a normally open momentary contact switch, said first limit switch being closed by engagement by said pin's moving into locking engagement with said door, said second limit switch being closed by engagement with said pin upon movement thereof to an open position, and said relay coils moving a motor switch selectively to closed and open positions upon actuation thereof by simultaneous closing of the secure switch and one of the first and second limit switches, respectively; and a motor actuation circuit comprising means connecting said motor across said voltage source in series with said motor switch, thereby to close said motor switch to actuate said motor and move said locking pin from said door upon closing of said secure switch when said first limit switch is closed, and to deactuate said motor by opening said motor switch upon closing of said secure switch when said second limit switch is closed, allowing said resilient means to rotate said arm and shaft and to move said pin into locking engagement with said door.

4. The combination of claim 3, further comprising a secure lockable housing enclosing said motor, said secure switch, and said linkage means and fastened to said fixed frame djacent said door.

5. The combination of claim 3, wherein said secure switch is a momentary contact responsive to a radio receiver, said contact being actuable only by a selected radio frequency signal.

6. The combination of claim 4, wherein said secure switch is a key-operated momentary contact switch.

7. The combination of claim 1, wherein said motor shaft has a slow throw from first to second positions approximating 20 seconds.

8. The combination of claim 1, further comprising in a parallel circuit across a voltage source:

a first-colored lamp and a first normally-closed contact in series therewith; and a second-colored lamp and a second normally-open momentary contact switch in series therewith, the voltage source being switched between said first and second contacts upon full withdrawal of the pin from the aperture in said door to extinguish said first-colored lamp and to light said second-colored lamp to indicate that the door may be opened.

* * * * *